Feb. 27, 1951          R. DUSATKO          2,543,569
                    FISHING ROD HOLDER
                    Filed July 5, 1949
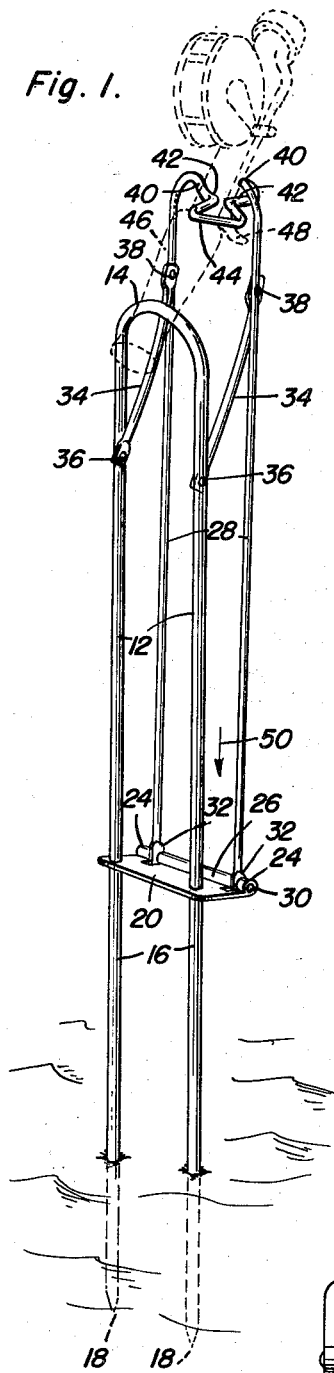
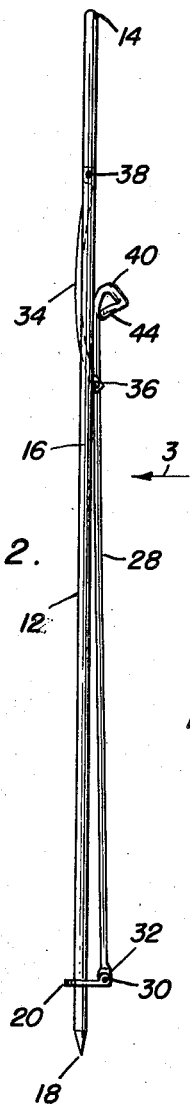
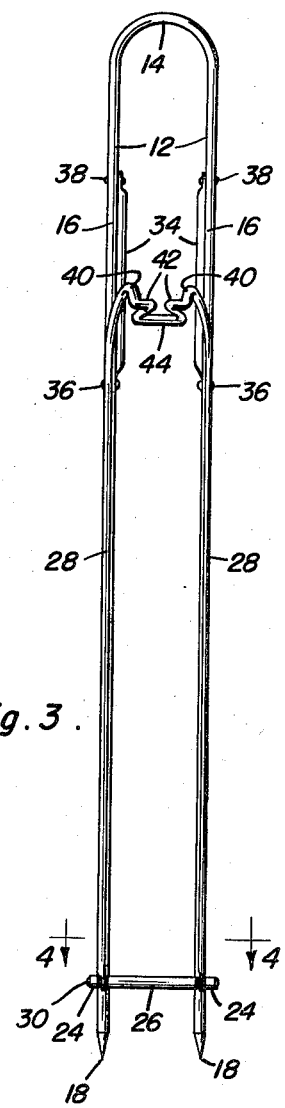
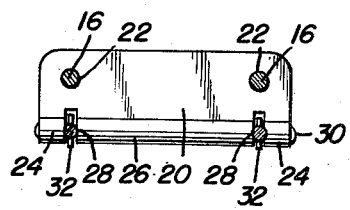
Raymond Dusatko
            INVENTOR.
BY *Clarence A. O'Brien*
   *and Harvey B. Jacobson*
                    Attorneys Patented Feb. 27, 1951

2,543,569

UNITED STATES PATENT OFFICE 2,543,569

FISHING ROD HOLDER

Raymond Dusatko, Brainard, Nebr.

Application July 5, 1949, Serial No. 103,143

3 Claims. (Cl. 248—42)

This invention relates to new and useful improvements and structural refinements in holders for fishing rods, and the principal object of the invention is to facilitate convenient and dependable supporting of a fishing rod, this being arranged in such manner that the angular position of the fishing rod in the holder may be adjusted as desired.

An important feature of the invention, therefore, resides in the structure of the holder including the adjusting means, while another feature resides in the collapsibility of the holder which permits the same to be quickly and easily folded for convenient transportation or storage.

Some of the advantages of the invention lie in its simplicity of construction, in its pleasing appearance, in its dependable operation, and in its adaptability to economical manufacture.

With the above more important objects and features in view and such other objects and features as may become apparent as this specification proceeds, the invention consists essentially of the arrangement and construction of parts as illustrated in the accompanying drawings, in which:

Figure 1 is a perspective view of the invention in its erected position, showing by dotted lines a portion of a fishing rod in situ therein.

Figure 2 is a side elevational view of the invention in its folded or collapsed position.

Figure 3 is an elevational view of the folded holder, this being taken in a direction of the arrow 3 in Figure 2, and Figure 4 is a cross sectional detail, taken substantially in the plane of the line 4—4 in Figure 3.

Like characters of reference are employed to designate like parts in the specification and throughout the several views.

Referring now to the accompanying drawings in detail, the invention consists of a fishing rod holder designated generally by the reference character 10, the same embodying in its construction an inverted U-shaped support 12, the latter including a bight portion 14 and a pair of spaced parallel side portions 16 which terminate at their free ends in pointed extremities 18 so that they may be readily inserted in the ground, as will be clearly apparent.

A locking plate 20 is provided with a pair of apertures 22 to slidably receive the side portions 16 of the support 12 and is also formed at one edge thereof with rolled tubular portions constituting spaced, longitudinally aligned bearings 24, 26.

An inverted U-shaped strut 28 has free end portions thereof disposed in the spaces between the bearings 24, 26 and is pivotally mounted on a pin 30 which is journaled in the bearings, the free ends of the strut 28 preferably being flattened as indicated at 32.

A pair of slightly arcuated links 34 are pivoted as at 36 to the side portions 16 of the support 12 adjacent the bight portion 14, and are also pivoted as at 38 to the strut 28, as is best shown in Figure 1.

Finally, it is to be noted that the bight portion of the strut 28 is downturned and angulated so as to provide a pair of spaced shoulders 40 disposed at the outside of a pair of spaced ledges or seats 42 which, in turn, are provided at the apex of a substantially triangular keeper portion 44.

When the invention is placed in use the handle of a casting rod 46 is positioned in the bight portion 14 of the support 12, and also, on the ledges 42, whereby the rod will be supported in the holder at a predetermined angle. The shoulders 40 will effectively prevent the rod from being displaced laterally, while longitudinal shifting is prevented by inserting the usual "trigger" 48 of the rod into the keeper portion 44.

It is to be noted that the weight of the fishing rod and of the strut 28 exerts a downward pressure on the plate 20 as shown at 50, thus causing the side portions 16 of the support 12 to bind in the apertures 22 so that the plate 20 is frictionally retained in a predetermined position on the portions 16 and the rod 46 is supported at a predetermined angle.

However, this angle of support of the fishing rod may be readily adjusted by simply exerting slight upward pressure on the plate 20 and thereafter sliding the plate on the portions 16 of the support 12 as required.

Moreover, when the invention is not in use, the fishing rod may be removed and the plate 20 may be permitted to slide downwardly on the support portions 16 so that the entire holder assumes a substantially flat, folded position, as is best shown in Figure 2.

It is believed that the advantages and use of the invention will be clearly apparent from the foregoing disclosure and accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

1. In a fishing rod holder, the combination of an inverted U-shaped support adapted to receive the handle portion of a fishing rod in the bight portion thereof, a plate slidably adjustable on and frictionally engageable with intermediate portions of said support, an inverted U-shaped strut having its free end portions pivoted to said plate and extending upwardly and outwardly from said support, the bight portion of said strut being provided with a fishing rod receiving seat, and means connecting the upper end portion of said support to the upper end portion of said strut.

2. The device as defined in claim 1 wherein said means comprise a pair of links pivoted to the sides of said support and strut.

3. A fishing rod holder comprising an inverted U-shaped support having pointed free end portions for insertion in the ground and having its bight portion adapted to receive the handle portion of a fishing rod, a plate provided with a pair of apertures to slidably receive side portions of said support whereby said plate may be adjustably retained by frictional engagement on said side portions, an inverted U-shaped strut having its free ends pivoted to said plate and extending upwardly and outwardly from said support, and a pair of links pivoted to the side portions of the support and to the side portions of said strut, the bight portion of the strut being angulated to provide a fishing rod receiving seat.

RAYMOND DUSATKO.

No references cited.